United States Patent [19]
Tobler et al.

[11] Patent Number: 5,277,825
[45] Date of Patent: * Jan. 11, 1994

[54] METHOD FOR TREATING SLUDGE

[76] Inventors: Hugh J. Tobler, 1100 N. 14th St.; Larry G. Lepper, 1411 E. Euclid, both of Indianola, Iowa 50125

[*] Notice: The portion of the term of this patent subsequent to Jan. 1, 2008 has been disclaimed.

[21] Appl. No.: 961,516

[22] Filed: Oct. 15, 1992

Related U.S. Application Data

[62] Division of Ser. No. 629,275, Dec. 18, 1990, which is a division of Ser. No. 435,257, Nov. 13, 1989, Pat. No. 4,981,600.

[51] Int. Cl.$^5$ .............................................. C02F 11/14
[52] U.S. Cl. .................................. 210/739; 210/751; 210/780; 210/806; 71/12
[58] Field of Search ............... 210/87, 88, 96.1, 101, 210/103, 134, 143, 145, 205, 219, 224, 225, 251, 609, 739, 749, 751, 780, 806, 808; 71/12, 13; 100/73, 74, 935; 241/42, 60, 101

[56] References Cited

U.S. PATENT DOCUMENTS

| | | | |
|---|---|---|---|
| 4,053,394 | 10/1977 | Fisk | 210/609 |
| 4,192,746 | 3/1980 | Arvanitakis | 210/806 |
| 4,341,562 | 7/1982 | Ahlbeck | 106/97 |
| 4,380,496 | 4/1983 | Maffet | 210/780 |
| 4,432,800 | 2/1984 | Kneller et al. | 106/85 |
| 4,471,916 | 9/1984 | Donaldson | 241/42 |
| 4,554,002 | 11/1985 | Nicholson | 71/12 |
| 4,710,290 | 12/1987 | Briltz | 210/205 |
| 4,741,836 | 3/1988 | Jackman | 210/780 |
| 4,781,842 | 11/1988 | Nicholson | 210/751 |
| 4,871,449 | 10/1989 | Lott | 210/134 |

OTHER PUBLICATIONS

Water Pollution Control Federation, "Sludge Stabilization Manuel of Practice FD-9", pp. 87–94 (1985).
Semon, Jeannette A., "Post Lime Stabilization of Sludge," pp. 67–67 (Oct. 22, 1981).
Camp, Dresser & McKee, Inc., "Lime Stabilization and Ultimate Disposal of Municipal Wastewater Sludges," pp. 1–180 (May 1981).

Primary Examiner—Thomas Wyse
Attorney, Agent, or Firm—Zarley, McKee, Thomte, Voorhees & Sease

[57] ABSTRACT

The method and apparatus of the present invention comprise an elongated auger housing having a rotatable auger therein. Augers are provided for delivering sludge and an additive such as cement kiln dust to the intake end of the mixer housing. An auger within the mixer housing conveys the material to the discharge end of the housing, and at the same time mixes the materials together.

5 Claims, 2 Drawing Sheets

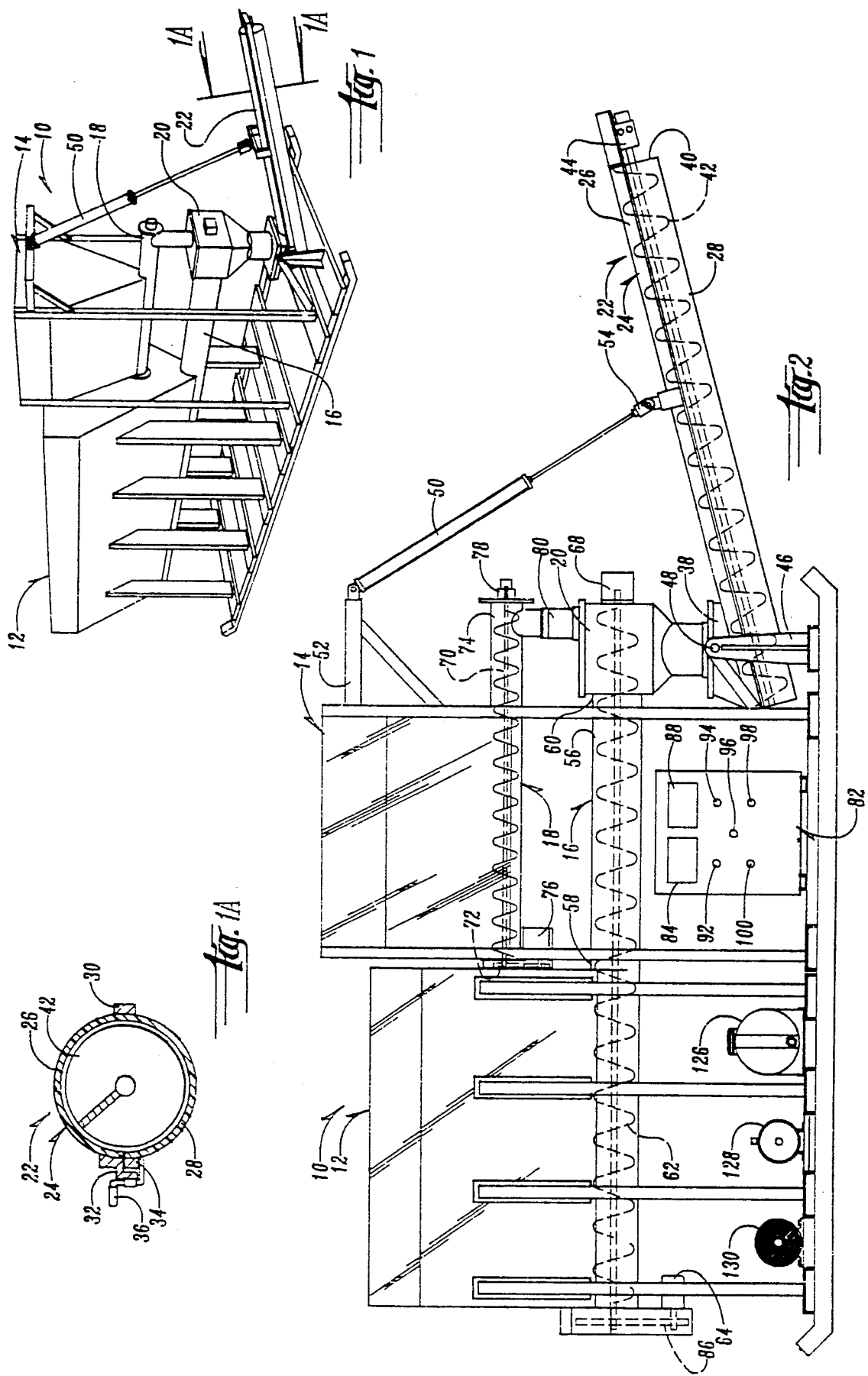

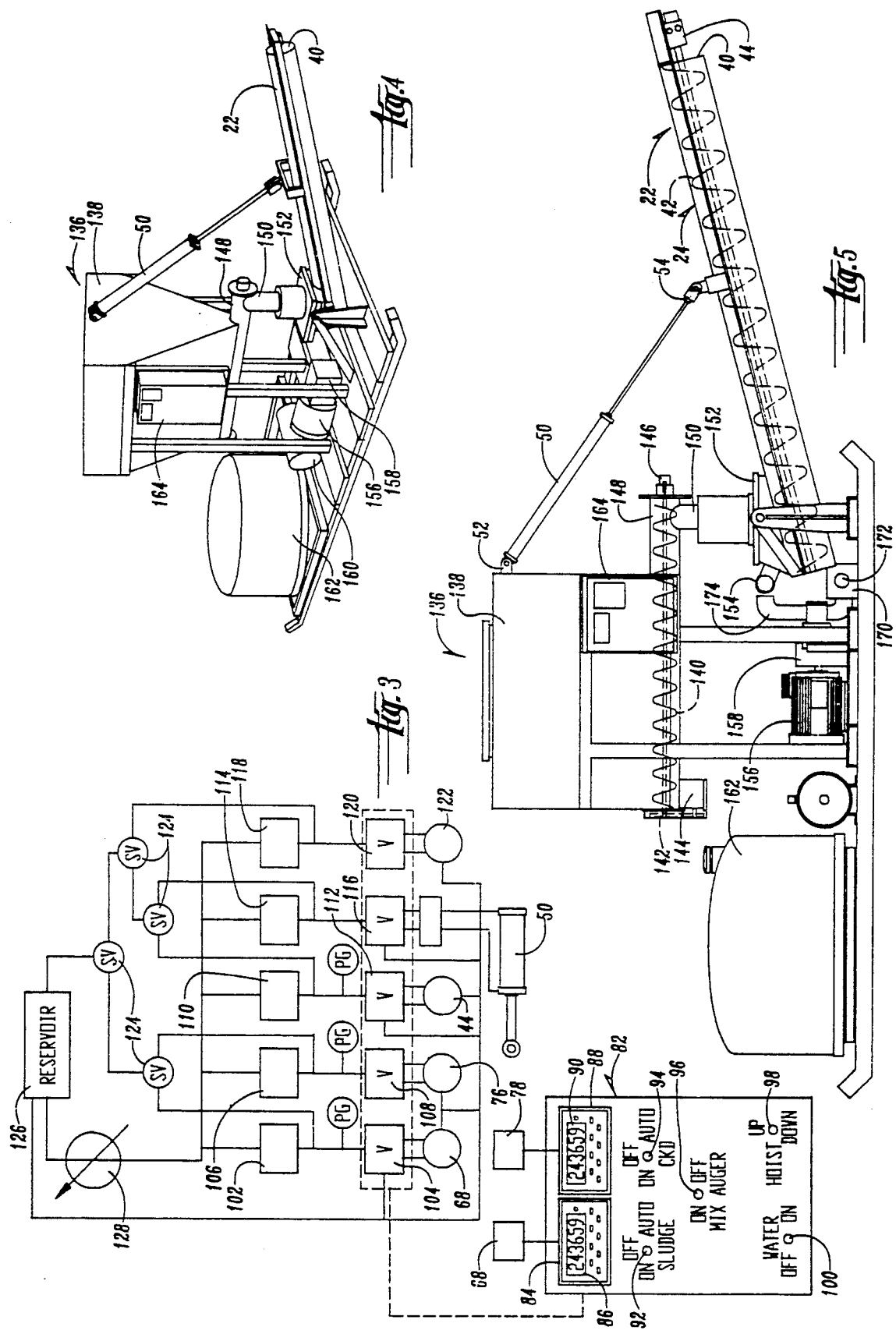

METHOD FOR TREATING SLUDGE

This is a divisional of copending application Ser. No. 629,275, filed on Dec. 18, 1990, which is a divisional of application Ser. No. 435,257, filed Nov. 13, 1989, now U.S. Pat. NO. 4,981,660.

BACKGROUND OF THE INVENTION

This invention relates to a method and means for treating sludge.

It has been found that waste sludge can be treated by mixing cement kiln dust, lime, or other alkaline materials with the sludge in such a manner as to produce a disentegrable, friable product which can be applied to land as a soil conditioner. Examples of these methods are shown in U.S. Pat. Nos. 4,781,842, and 4,554,002 issued to N-Viro Energy Systems, Ltd.

While these patents show the desirability of mixing cement kiln dust or other alkaline materials with the sludge, these patents do not disclose the apparatus or methods for accomplishing the mixing. Waste sludge is a difficult material to handle. It can come in a highly liquid form, or it can come in a dewatered form which has a mud-like consistency. It is essential that the cement kiln dust be mixed with the sludge as thoroughly as possible.

Therefore, a primary object of the present invention is the provision of an improved method and means for treating sludge.

A further object of the present invention is the provision of a method and means for treating sludge which comprises mixing cement kiln dust or other alkaline materials with the sludge in an elongated auger mixer.

A further object of the present invention is the provision of a method and means for treating sludge which permits the easy adjustment of the ratios of kiln dust or alkaline materials relative to the amount of sludge being treated.

A further object of the present invention is the provision of a method and means for treating sludge which is economical to manufacture, durable in use, and efficient in operation.

SUMMARY OF THE INVENTION

The present invention utilizes an auger mixer similar to the auger mixers which have been used in the prior art for mixing cement and cement aggregate. The auger mixer comprises an elongated cylindrical housing having an upper wall formed from rigid metal, and having a lower arcuate wall formed from a flexible elastomeric material such as rubber. Within the auger housing is an elongated auger. The housing includes an inlet end and a discharge end.

The present invention utilizes an additive hopper having an additive conveyor for conveying material from the additive hopper to the inlet end of the mixer housing. Similarly, the present invention utilizes a conveyor for conveying the waste sludge to the inlet end of the auger mixer. The auger mixer conveys the additive and the sludge from the inlet end of the mixer housing to the discharge end of the mixer housing. The auger also cooperates with the flexible wall of the mixer housing to cause the additive and the sludge to be mixed together thoroughly.

A control system is connected to the two conveyors for conveying the sludge and the additives to the mixer housing. The control system includes a pair of rotary pulse generators connected to the additive conveyor and the sludge conveyor for sensing the rate with which the two conveyors deliver sludge and additive to the inlet end of the mixer housing. The rotary pulse generators are connected to two display panels which display the relative rates and totals of delivery of the additive and of the sludge. The control system includes means for controlling the rates and totals of delivery of the additive and the sludge so that the desired ratio of mixture can be achieved.

The preferred rotary pulse generators for use with the present invention are manufactured by Red Line Controls, 20 Willow Spring Circle, R. D.#5, York, Pa. 17402, under the model designation "Model RPGC".

The preferred control system comprises a six-digit, presetable counter/rate or dual counter indicator manufactured by Red Line Controls, 20 Willow spring Circle, R. D.#5, York, Pa. 17402, under the trade designation Gemini 4100. These controllers are capable of receiving the information from the pulse generators, and for displaying digitally the rate at which the various ingredients are being delivered. The controllers are also programmable so that the desired rotational speeds can be set and controlled automatically.

BRIEF DESCRIPTION OF THE DRAWINGS

FIG. 1 is a perspective view of one form of the machine of the present invention.

FIG. 1A—1A is a sectional view taken along line 1A—1A of FIG. 1.

FIG. 2 is an elevational view showing the location of the various augers schematically.

FIG. 3 is a schematic view of the hydraulic circuitry of the present invention and connection of the controller to the hydraulic circuitry.

FIG. 4 is a perspective view of a modified form of the present invention.

FIG. 5 is a side elevational view of the machine shown in FIG. 4, showing the augers schematically.

DESCRIPTION OF THE PREFERRED EMBODIMENT

Referring now to FIGS. 1-3, a sludge treating machine is generally designated by the numeral 10. Machine 10 includes a sludge hopper 12, an additive hopper 14, a sludge conveyor 16, an additive conveyor 18, a mixing hopper 20, and a mixer 22.

Mixer 22 comprises a mixer housing 24 which has a flexible upper half 26 and a flexible lower half 28. Housing 24 is made of an elastomeric material such as rubber or any other flexible material capable of yielding and moving slightly in response to internal pressures. The upper half 26 of housing 22 is free to bend with respect to the lower half 28 for hinged movement about reinforcing rib 30 (FIG. 1A). A latch rib 32 is connected to one edge of upper half 26 and mates with a support rib 34 on flexible member 28. A latch 36 locks the upper half 26 to the lower half 28.

Mixer 22 includes an inlet opening 38 and a discharge opening 40. Within the mixer housing 24 is an elongated mixer auger 42 which is driven by a hydraulic mixer motor 44. The inlet end of mixer 22 is hinged to a hinge support 46 for pivotal movement about a horizontal hinge axis 48. A lift cylinder 50 is connected at its lower end 54 to the mixer 22 and is connected at its upper end to an upper cylinder mount 52. During operation of the mixer, the mixer is held in a slightly inclined orientation as shown in FIG. 2 so that the auger 42 is required to move the material being mixed upwardly within mixer 22.

The structure of mixer 22 has been utilized in the prior art for mixing cement with aggregate and water. Normally, cement, water, and aggregate are introduced to the inlet end, and the auger rotates to mix the cement aggregate and water and discharge fully mixed concrete from the discharge end 40. However, the particular mixer 22 has not heretofore been used to treat sludge or to mix any materials with sludge. Furthermore, mixer 22 has not been used in the prior art in combination with a sludge hopper and conveyor or a sludge additive hopper and conveyor.

Mounted within the lower end of sludge hopper 12 is an elongated sludge auger 62 which is driven by a sludge auger motor 64 through a chain and drive box 66. Auger 62 is exposed in the lower end of hopper 12, but extends forwardly therefrom through a sludge conveyor tube 56 which has a rear end 58 adjacent hopper 12 and a forward end 60 in communication with the interior of mixing hopper 20. A sludge rotary pulse generator 68 is connected to the shaft of auger 64 for sensing the rotational speed of sludge auger 62.

Rotation of sludge auger 62 causes the sludge within sludge hopper 12 to be conveyed by sludge auger 12 through sludge conveyor tube 56 into the mixer hopper 20 and thence downwardly through inlet opening 38 into the mixer 22.

Mounted within the lower end of additive hopper 14 is an additive auger 70. Auger 70 is driven by a chain drive 72 which is connected to a hydraulic additive motor 76. Additive auger 70 extends forwardly into an additive tube 74 which is in communication with a downwardly extending spout 80 which empties into mixing hopper 20. An additive rotary pulse generator 78 is connected to the shaft of additive auger 70 so as to sense the rotational speed of additive auger 70.

Additive hopper 14 preferably should include cement kiln dust, fly ash, or other alkaline materials, or any combinations of the aforementioned materials.

A control unit 82 is provided for controlling the operation of the various moving parts. Control unit 82 includes a sludge controller 84 having a sludge display 86 thereon (FIG. 3). An additive controller 88 is also provided and includes an additive display 90. As explained previously, the sludge controller 84 and the additive controller 88 are preferably the Gemini 4100 model six digit, presetable counter/rate or dual counter indicator identified above. Controller 88 also includes a sludge conveyor switch 92, an additive conveyor switch 94, a mixer auger switch 96, a hoist switch 98, and a water switch 100.

Sludge controller 84 is connected to rotary pulse generator 68, and additive controller 88 is connected to rotary pulse generator 78. The pulse generators 68, 78 sense the rotational speeds of the sludge auger and the additive auger respectively, and register the rate of flow on the digital displays 86, 90 respectively. Control of the rate of flow of sludge and additive is provided by changing manual adjustments (not shown) on the pressure compensated flow control valves 102, 106 shown in FIG. 3 so as to cause the hydraulic motors 68, 76 to be driven at predetermined speeds. Valves 102, 106 are manually adjusted until the desired rates of flow are registered on display 86, 90. The sludge switch 92 is movable to an on/off position which causes opening or closing of valve 104 to motor 68, position or is also movable to an automatic position which is used when the sludge motor 68, the additive motor 76, and the mixer 44 are all operating in unison. Similarly, the additive switch 94 can be placed in an on./off position to open or close valve 108, or can be placed in an automatic position during operation of all motors 68, 76, 44 at once.

In the hydraulic circuitry for mixer motor 44 are a pressure compensated flow control valve 110 and an on/off valve 112. Mixer switch 96 has an on/off position which controls mixer valve 112, and an automatic position for simultaneous operation of hydraulic motors 68, 76, and 44.

Cylinder 50 is connected in series to a pressure compensated flow control valve 114 and an on./off valve 116. Hoist switch 98 controls hoist valve 116 which is connected to the cylinder 50 for raising and lowering mixer 22.

A water pump 122 (shown schematically only) is connected to water switch 100, water pump pressure compensated flow control valve 118, and water valve 120 and is adapted to pump water from a water source (not shown) for cleaning the mixer 22.

The hydraulic circuitry includes a plurality of check valves 124, a hydraulic pump 128, and a reservoir 126. Pump 128 is driven by an electric drive motor 130 (FIG. 1).

In operation, the sludge hopper 12 is filled with sludge, and the additive hopper 14 is filled with an additive such as cement kiln dust, fly ash, or other alkaline materials, preferably in a powdered form. The control unit 82 is used to actuate and rotate augers 62, 70 so as to carry sludge and additive to the mixer hopper 20 where the combined materials fall by gravity into the inlet end 38 of the mixer 22. The mixer auger 42 within the mixer 22 rotates and causes the additive to be mixed thoroughly with the sludge and conveyed upwardly to the discharge end 40 where the mixed material is discharged. It has been found that the use of the present machine provides very thorough mixing of the additive and the sludge, and results in the sludge being treated in such a manner that it can be readily converted into a material which can be deposited on soil for fertilization purposes. Machine 10 will work well with a highly viscous form of sludge, having a consistency much the same as mud.

Referring to FIGS. 4 and 5, a modified form of the device is shown for use with waste sludge which is in a substantially liquid state. The device of FIG. 4 is referred to generally by the numeral 136, and includes an additive hopper 138, an additive auger 140 driven by chain and sprocket 142 and additive motor 144. Additive auger 140 extends forwardly into an additive tube 148 which is connected to an additive spout 150 extending downwardly into a mixing hopper 152. A rotary pulse generator 146 may be connected to additive auger 140 and used in combination with a controller 164 in much the same manner as described for additive controller 88 shown in FIG. 3. A sludge spout 154 is in communication with mixing hopper 152 and is adapted to be connected to a source of liquid waste sludge. This source can include a hose or pipe which can be coupled to sludge spout 154 and which may lead from a lagoon or other source of liquid sludge.

A sludge pump 170 is provided and includes an inlet opening 172 which can be connected to a lagoon or other source of liquid sludge. An outlet conduit 174 leads from pump 170 and can be connected to spout 154. Thus, it is possible to connect the source of sludge directly to spout 154 if a pump is present at the sludge source, or, in the alternative, pump 170 can be connected to the sludge source.

An electric motor 156 drives a hydraulic pump 158 which is used for the hydraulic circuitry of the device. The mixer 22 is the same as the mixer shown in FIGS. 1-3, and therefore, corresponding numerals are shown. A water tank 162 includes water for cleaning the mixer 22 after it has been used. Air is for vibrators and air diffusion pad.

The method and means described above for treating waste water sludge is very efficient and thorough in mixing the cement kiln dust or other alkaline materials with the sludge. The result of the use of this machinery is that the sludge is quickly and easily treated and made ready for deposit as a soil additive in agricultural areas. The machinery and method of the present invention permit the continuous treatment of the sludge in a very efficient manner. Thus, it can be seen that the device accomplishes at least all of its stated objectives.

We claim:

1. A method for treating sludge comprising:
   placing dewatered sludge having a mud-like consistency in a sludge hopper;
   placing a sludge additive material in an additive hopper;
   using a sludge auger means capable of rotating at variable speeds for conveying said dewatered sludge to an inlet opening of an elongated mixer housing having a discharge opening spaced from said inlet opening;
   using an additive auger means capable of operating at variable speeds for conveying said additive material from said additive hopper to said inlet opening of said mixer housing;
   rotating an elongated mixing member within said mixer housing to mix said dewatered sludge and said sludge additive material and to convey said mixed sludge and additive material to said discharge opening of said mixer housing;
   sensing the rotational speed of said sludge auger means;
   displaying first visual stimuli on a control panel corresponding to said sensed rotational speed of said sludge auger means;
   sensing the rotational speed of said additive auger means;
   displaying second visual stimuli on said control panel corresponding to said sensed rotational speed of said additive auger means;
   changing the rotational speed of at least one of said sludge auger means and said additive auger means until said first and second visual stimuli displayed on said control panel correspond to the desired relative rotational speeds of said sludge auger means and said additive auger means.

2. A method according to claim 1 and further comprising changing the rotational speeds of both said sludge auger means and said additive auger means until said first and second visual stimuli displayed on said control panel correspond to the desired magnitudes of rotational speeds of said sludge auger means and said additive auger means while at the same time maintaining the desired ratio of rotational speeds of said sludge auger means and said additive auger means.

3. A method according to claim 1 and further comprising positioning said mixer housing in an inclined position with said discharge opening above said inlet opening, and changing the angle of inclination of said mixer housing to achieve the desired mixing of said sludge and said additive material within said mixer housing.

4. A method according to claim 1 and further comprising changing the rotational speed of said mixing member within said housing to achieve the desired mixing of said sludge and said additive material within said mixer housing.

5. A method for treating sludge comprising:
   placing dewatered sludge having a mud-like consistency in a sludge hopper;
   placing a sludge additive material in an additive hopper;
   using a sludge auger means capable of rotating at variable speeds for conveying said dewatered sludge to an inlet opening of an elongated mixer housing having a discharge opening spaced from said inlet opening;
   using an additive auger means capable of operating at variable speeds for conveying said additive material from said additive hopper to said inlet opening of said mixer housing;
   rotating an elongated mixing member within said mixer housing to mix said dewatered sludge and said sludge additive material and to convey said mixed sludge and additive material to said discharge opening of said mixer housing;
   changing the rotational speeds of said sludge auger means and said additive auger means independently of one another and independently of said elongated mixing member so as to achieve the desired volume and ratio of said sludge and said additive material being conveyed to said inlet opening of said mixer housing.

* * * * *